Jan. 13, 1970  J. M. PATTERSON  3,489,351

HIGH CONCENTRATE SPRAYER

Filed Oct. 13, 1967  5 Sheets-Sheet 1

FIG_1

FIG_2

INVENTOR.
JOSEPH M. PATTERSON
BY F. W. Anderson
C. E. Tripp
ATTORNEYS

United States Patent Office 3,489,351
Patented Jan. 13, 1970

3,489,351
HIGH CONCENTRATE SPRAYER
Joseph M. Patterson, Orange County, Fla., assignor to FMC Corporation, San Jose, Calif., a corporation of Delaware
Filed Oct. 13, 1967, Ser. No. 675,233
Int. Cl. A01n *17/08;* B05b *1/30*
U.S. Cl. 239—77                          10 Claims

ABSTRACT OF THE DISCLOSURE

Apparatus is shown for spraying orchards and the like with a high concentrate spray solution which is accurately metered in relationship to ground speed of the apparatus and the desired crop dosage rate. The spray is broken into small droplets and carried to the crop by air blasts having high velocity energy generated by a plurality of blowers in stacked relationship.

BACKGROUND OF THE INVENTION

Field of the invention

This invention pertains to art classified under fluid sprinkling, spraying and diffusing and more particularly to an orchard sprayer including a mobile distributor with fluid sprayed into a gaseous conveying current and having a mobile tank-type supply means with a ground wheel operated discharge controller.

DESCRIPTION OF THE PRIOR ART

There has been a growing trend in recent years to apply agricultural spray to crops in more concentrated solutions for economy reasons. When trees are drenched with spray by dilute application, there is a dripping or run-off period during which no work can be performed under the trees until the "washed down" has subsided. A significant loss of chemicals takes place in the runoff and such chemicals modify the composition of the soil beneath the trees. This often necessitates corrective soil treatment to restore fertility. Equipment used for applying dilute spray solution is large and heavy due to additional water handling and has not been satisfactory for applying concentrated spray solutions because of different application requirements.

Uniform spray distribution and accurate spray metering are essential when using concentrated spray solutions. An overdose of hot toxic chemicals tends to burn the vegetation treated, while any wasting of concentrated spray is costly. Furthermore, the vegetation must be uniformly covered if the spray is to perform its function. Known sprayers do not generate a high velocity carrier air blast that will evenly coat each leaf, twig and fruit on one side of a tree when using high concentrate sprays. With dilute spray solutions, the "washdown" assisted in achieving uniform spray distribution but this has been eliminated with high concentrate sprays. Dilute sprayers do not need the accuracy for metering spray solution that is required for concentrated sprays because of the difference in concentration. Orifice metering is inaccurate for high concentrate sprays because of wear and clogging, while independent spray pump drive does not compensate for variations in ground speed of the sprayer.

SUMMARY OF THE INVENTION

Objects of the present invention are to provide accurate spray metering and uniform spray distribution by a sprayer using high concentrate sprays to achieve greater economy in spraying.

Uniform spray distribution is obtained by "stacking" one blower on top of another blower, each blower having an axial inlet connected by an air flow passage to a radial outlet. The radial outlets are aligned to form a common discharge slot and ducted so that the fan-shaped discharges therefrom will blend together along top and bottom edges. Thus, a carrier air blast is developed which will cover from top to bottom of the largest tree to be sprayed, with substantially uniform velocity between top and bottom portions.

Accurate spray metering is developed by a proportional ground speed pump drive in combination with proportioning non-wear ceramic orifices positioned in each spray supply line between nozzle and pump. The spray supply system is balanced with by-pass lines so that certain nozzles can be shut off without changing the metered flow to nozzles remaining open and provision is made by check valves to prevent spray dripping from the nozzles when the sprayer is idling.

BRIEF DESCRIPTION OF THE DRAWINGS

FIGURE 1 is a perspective view of a high concentrate sprayer embodying the present invention, looking at the rear portion thereof.

FIGURE 2 is a perspective view of the sprayer shown in FIGURE 1, looking at the front portion thereof.

FIGURE 3 is a side elevation view of the sprayer shown in FIGURE 1, with portions broken away to show underlying structure.

FIGURE 4 is a section taken on the line 4—4 of FIGURE 3.

FIGURE 5 is a schematic diagram of a spray distribution system for the sprayer shown in FIGURE 1.

FIGURE 6 is a diagrammatic view illustrating the spray zones covered by the sprayer.

DESCRIPTION OF THE PREFERRED EMBODIMENT

A sprayer 10 is shown in FIGURE 1 having a main frame 12, including an axle 14 upon which wheels 16 are mounted. A drawbar 18 is provided at the front end of the frame, as shown in FIGURE 2, having a hitch 20 attached to the forward portion thereof. A hitch jack 22 is fixed to the drawbar for elevating the hitch to connect with a tractor and to support the front end of the sprayer when it is standing unattached.

A blower assembly 24, which is mounted at the rear of main frame 12, as shown in FIGURE 3, comprises a lower blower unit 25 and an upper unit 27 which are supported by two horizontally spaced, vertical walls 26 and 28. The walls are bolted at their lower end to the frame 12 and are interconnected adjacent their midpoints by stiffeners 30. The lower blower unit includes an outer cylindrical shell 32 that is fitted into aligned annular openings 26*a* and 28*a* in the walls 26 and 28, respectively, and an inner cylindrical shell 38 that is centered within the outer shell and is held in position by air straightening vanes 40 and 42 to define a cylindrical air passage 39.

A bearing support 44 is welded within the inner shell to support pillow block bearings 46 and 48. Impeller shaft 50 is journalled within the pillow block bearings and supports an impeller 52 within an axial opening 51 of a flared entrance ring 53 that has a flange 53a secured to the vertical wall 28. A rounded nose 54 is secured to the hub of the impeller to shield the fan shaft and bearings, while guard 56 covers the axial opening of the entrance ring to prevent objects from being drawn therein. A flared discharge ring 57 has a flange 57a secured to wall 26 and provides a central opening aligned with the opening defined by the outer shell 32 of the blower. A flared air guide member 58 is provided with an annular central portion 59 secured to the inner shell 38. The ring 57 and the member 58 cooperates to define an air outlet 60 through which the air blast is discharged from the blower. A bottom deflector 62 (see FIG. 4) is secured between the discharge guide 58 and the ring 57, spaced above the frame to deflect the air blast outwardly and upwardly. A vertical deflector 64 extends upward from the top portion of the inner shell 38 and separates the radial opening air outlet. From the top portion of the vertical deflector, a first splitter vane 66 extends in an arcuate path to the side of the blower unit to define the upper end of the radially opening air outlet on one side of the blower assembly. A second splitter vane 68 extends in an arcuate path from the top portion of the vertical deflector to the top of the radial opening air outlet on the opposite side of the blower assembly. These arcuate paths of the first and second splitter vanes become tangent to a horizontal line extending between the tops of the radial opening air outlets.

The upper blower unit 27 is substantially identical to the lower unit and includes an outer cylindrical shell 74 secured within openings 26b and 28b of the walls 26 and 28, respectively. A flared entrance ring 76, having an axial opening 77 is secured to wall 28 and extends downward to rest upon the flared entrance ring 53. Similarly, a flared discharge ring 78 is secured to the wall 26 and rests upon the flared discharge ring 57. Within the outer shell 74, an inner shell 80 is centered and held in place by air straightening vanes 82 and 84. A cylindrical air flow passage 85 is defined between the inner shell and the second outer shell, while within the inner shell a bearing support 86 is secured and pillow block bearings 88 and 90 are mounted thereon. Impeller shaft 92 is journalled within the pillow block bearings and an impeller 94 is keyed to the end thereof within the axial opening. Spinning nose 96 fits over the end of the impeller to enclose the pillow blocks within the inner shell, and the axial opening 77 is covered by a guard 98 to prevent foreign objects from being drawn into the impeller.

A generally oval shaped sheet metal housing 99 is secured to adjacent members of the blower units and to two rigid vertical flanges 97 of the frame 12.

Figures 1, 2:
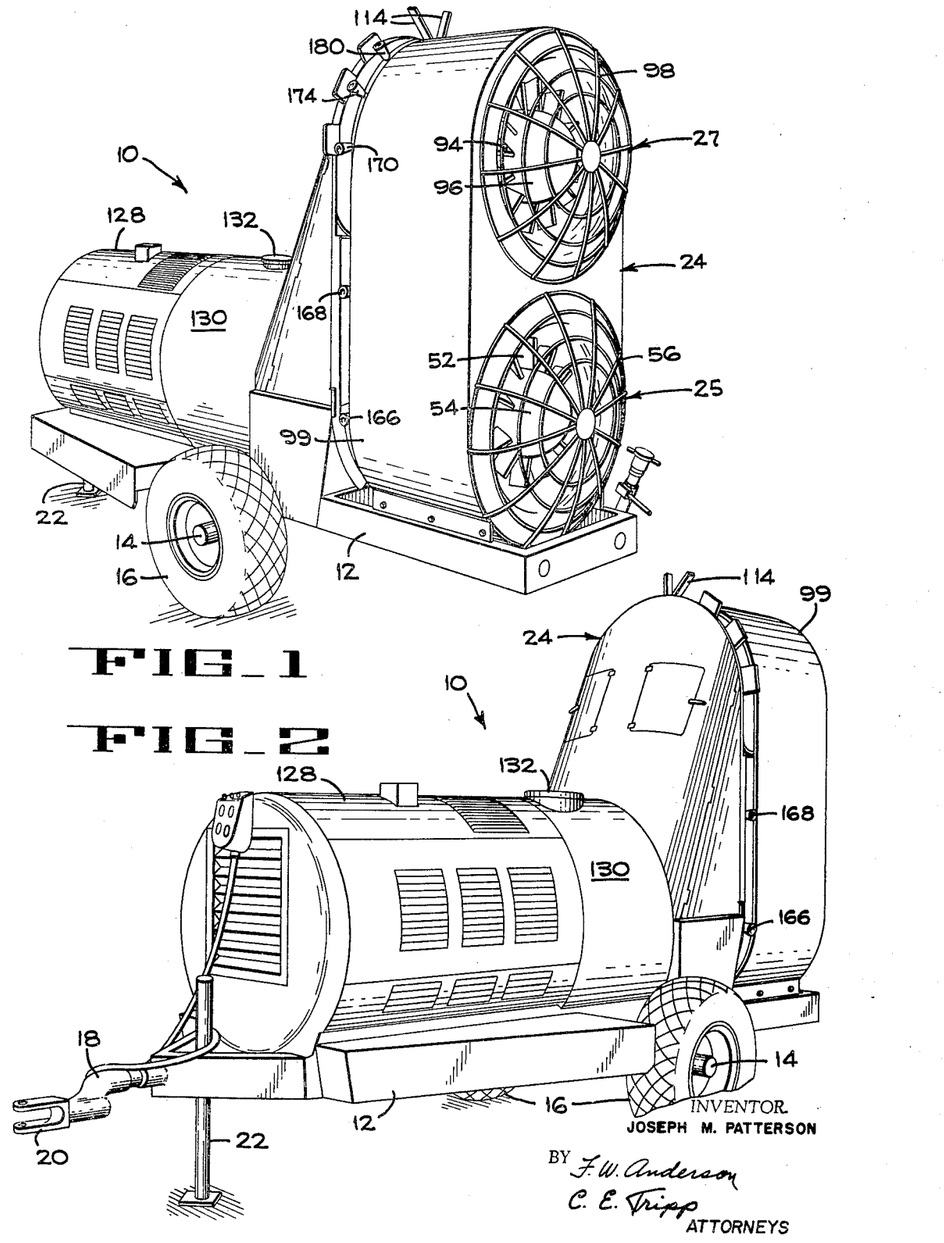
Figure 1:
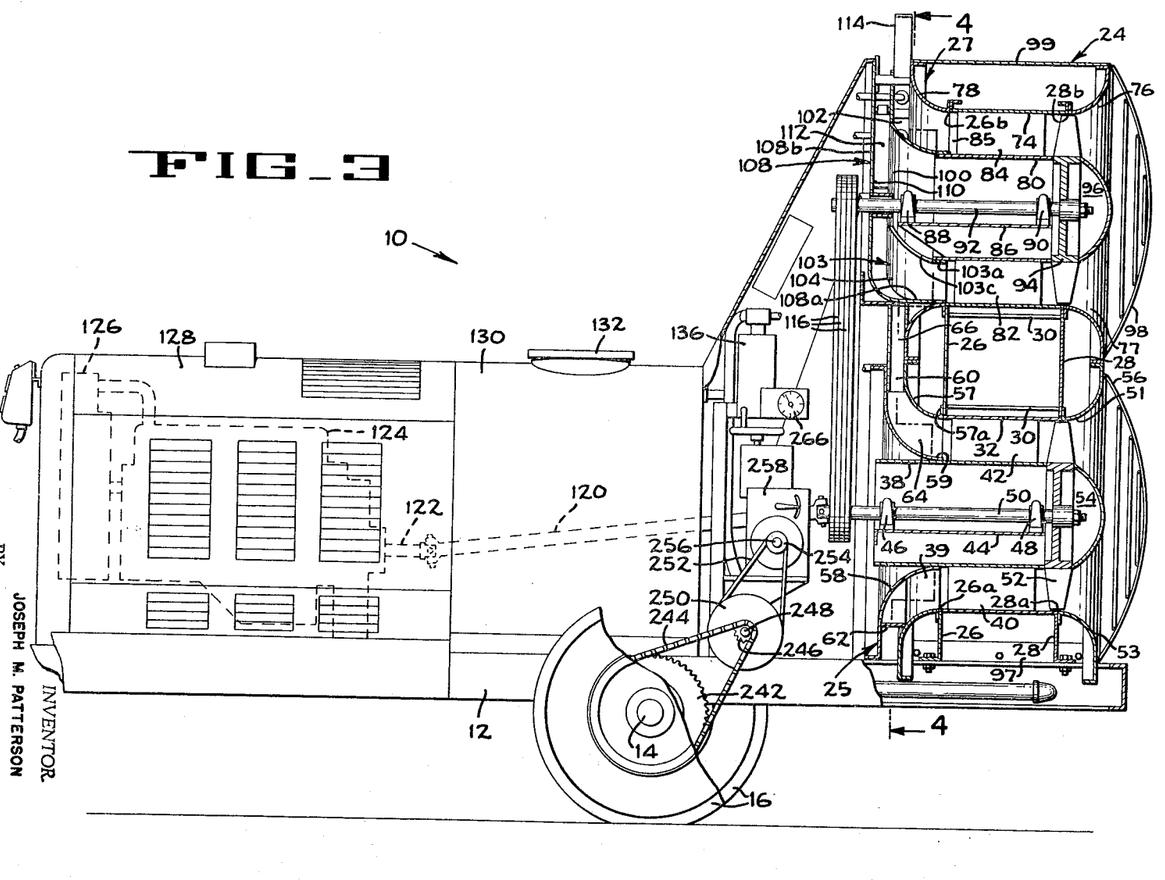
Figure 4:
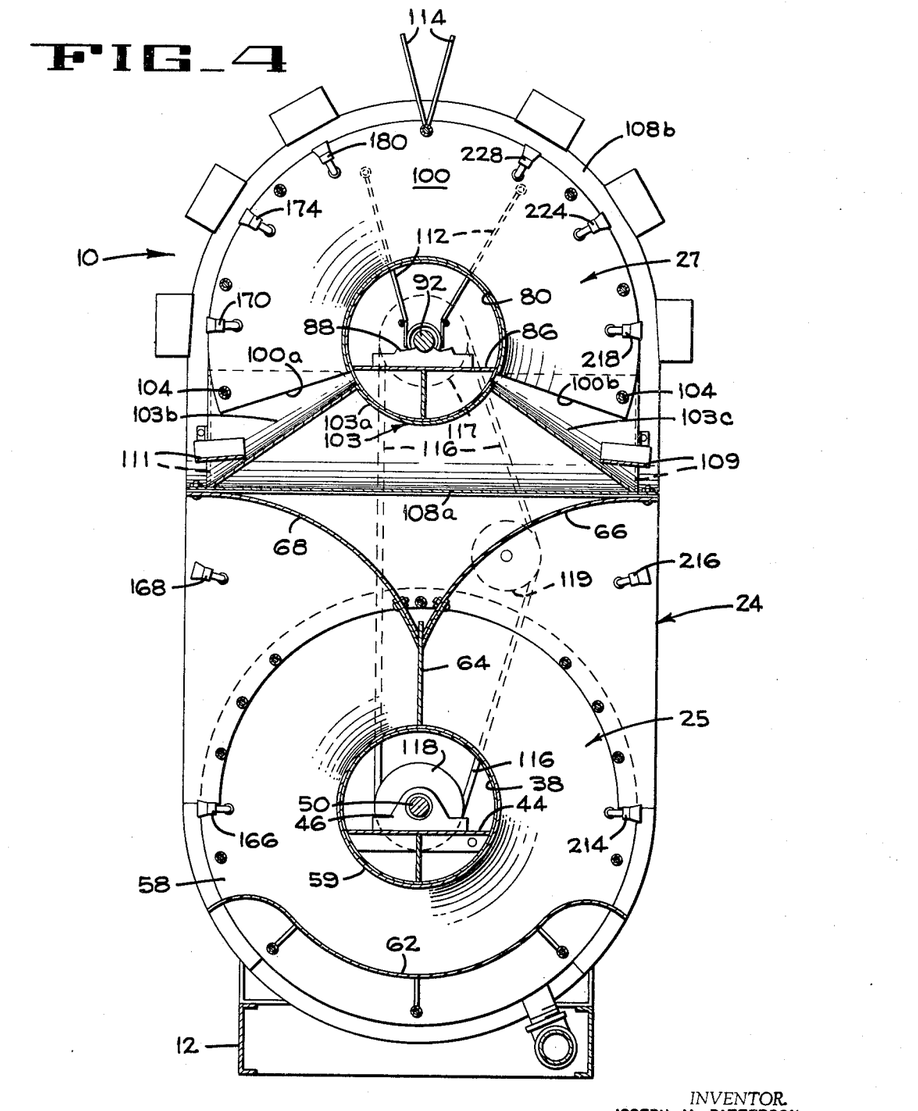

Positioned at the opposite end of inner shell 80 from the impeller 94 is a discharge guide 100 which flares outward in spaced relationship from the discharge ring 78 to define a radial opening air outlet 102, therebetween. In general, the guide 100 is identical to the flared guide 58 of the lower unit except that the guide 100 is cut off along edges 100a and 100b (FIG. 4). A separator plate 103 which has a central cylindrical strap portion 103a, secured to the inner shall 80, and two identical, oppositely disposed curved wings 103b and 103c each of which curves laterally and upwardly and is secured by bolts 104 to the rear face of the glide 100. Thus, air passing along passage 85 above the leading edges of the wings 103b and 103c will be diverted upwardly into the space between the guide 100 and the discharge ring 78 and out through the radial outlet 102. Air passing below the leading edges of the wings will be directed into engagement with a back scoop 108 which has a portion 108a underlying the separator plate 103 and a vertical portion 108b that is spaced rearwardly from the rear face of the guide 100 to define a second radial outlet 110. Baffles 109 and 111 are positioned between the discharge guide and back scoop to cover the lower outer edges of the second air outlet, while an adjustable V deflector 112 is pivotably mounted upon impeller shaft 92 for deflecting air outward as desired from the top of the second air outlet. Fixed deflectors 114 are positioned at the top of air outlet 102 for directing the air blast outwardly at a suitable angle of inclination to reach the tops of trees.

Impeller shaft 92 is coupled for rotation with impeller shaft 50 by a series of drive belts 116. These drive belts are trained about a pulley wheel 117, keyed to impeller shaft 92, and pulley wheel 118, keyed to impeller shaft 50. An idler wheel 119 is positioned in contact with the drive belts between the pulley wheels for adjusting the belt tension. Impeller shaft 50 is driven by a connecting rod 120 coupled with a drive shaft 122 of an engine 124. This engine, shown in dotted line in FIGURE 3, may be either a gasoline or diesel engine and has a radiator 126 enclosed within the housing 128.

A spray tank 130 (FIG. 3) is located between the engine housing 128 and the blower assembly 24 for storing a supply of spray solution. The tank is provided with a fill opening which is covered by a cap 132. Spray is distributed from the tank by a system, shown in FIGURE 5, having a conduit 134 linking the spray tank to the suction side of a two cylinder pump 136. This pump has a pair of discharge ports 137 and 139, each port being supplied by a separate pump cylinder. A conduit 138 connects discharge port 137 to a filter and anti-pulsation air chamber 140, which is linked with a manifold 144. Nozzle supply lines 145, 146, 147, 148 and 149 are coupled at one end to the manifold and near the opposite ends proportioning orifices 150, 151, 152, 153 and 154, respectively, are positioned. These proportioning orifices are made of a non-wear ceramic material and determine the flow within the nozzle supply lines, together with the pump rate. Since it is desirable to have a greater flow from the upper nozzles for spraying the top portion of trees, the orifices 153 and 154 have a larger opening diameter than orifices 150, 151 and 152.

Figure 5:
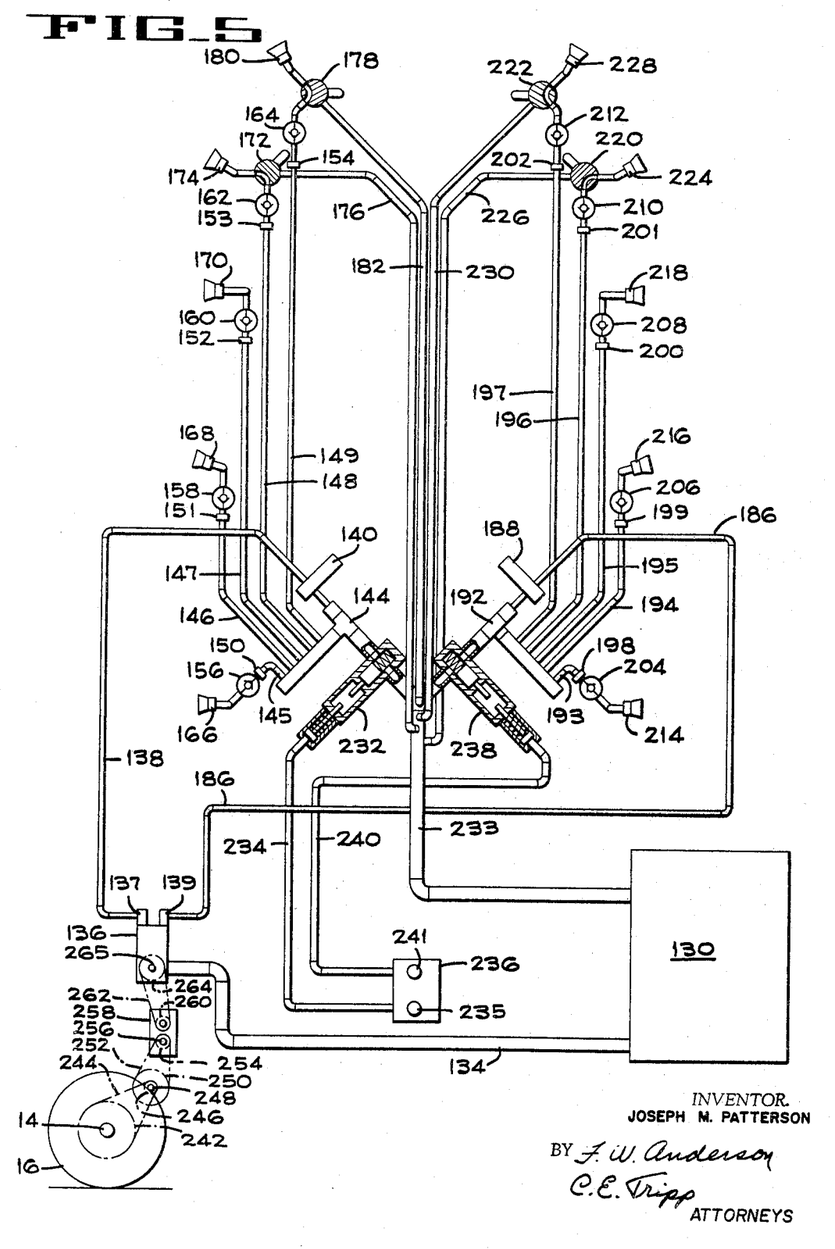

Positioned next to the proportioning orifices within nozzle supply lines 145, 146, 147, 148 and 149 are check valves 156, 158, 160, 162 and 164, respectively. These check valves are a diaphragm type which block the flow within the line when the pressure therein drops below a selected minimum. Such check valves are manufactured by Spraying Systems Company of Bellwood, Ill. and identified as No. 10742. Nozzles 166, 168 and 170 are mounted next to check valves 156, 158 and 160, respectively and are a spinning cone type manufactured by the John Bean Division of FMC Corporation at Lansing, Mich. under trademark Cyclone. It is desirable to be able to shut off the flow from nozzle supply lines 148 and 149 when spraying small trees and therefore, a manual two-way control valve 172 is positioned between check valve 162 and a "Cycone" nozzle 174. A by-pass line 176 is coupled with the control valve for returning flow to spray tank 130 when spray from nozzle 174 is not desired. Similarly, a manual two-way control valve 178 is positioned between check valve 164 and a "Cycone" nozzle 180, with by-pass line 182 being coupled thereto for returning flow to the spray tank.

A conduit 186 extends from pump discharge port 139 to a filter and anti-pulsation air chamber 188, which in turn is linked to manifold 192. Nozzle supply lines 193, 194, 195, 196 and 197 extend from the manifold to proportioning orifices 198, 199, 200, 201 and 202, respectively. These proportioning orifices are similar to those previously described and orifices 201 and 202 have a larger diameter than orifices 198, 199 and 200 so that more spray will be delivered to the tops of trees. Check valves 204, 206, 208, 210 and 212 are positioned respectively in the nozzle supply lines 193, 194, 195, 196 and 197 and are of the diaphragm type previously described. "Cycone" nozzles 214, 216 and 218 are connected to check valves 204, 206 and 208, respectively, while manual two-way control valves 220 and 222 are coupled to check valves 210 and 212, respectively. A "Cycone" nozzle 224 is mounted on one side of control valve 220, while a by-pass line 226 is connected to the opposite side for returning flow to the spray tank 130. A "Cycone" nozzle 228 is coupled with one side of control valve 222 and by-line 230 is fitted to the opposite side of the valve for returning flow to the spray tank.

Since it is often desirable to spray only one side of a row, a spray valve 232 is positioned between manifold 144 and a spray return line 233. This valve is controlled by a hydraulic line 234 regulated with a button 235 on remote control panel 236. When the valve is in an open position, flow passes directly through the manifold into the return line and back to spray tank 130, but when the spray valve is closed, flow is blocked from the return line forcing the spray up through the nozzle supply lines 145, 146, 147, 148 and 149. A similar spray valve 238 is positioned between manifold 192 and return line 233. This valve is controlled by a hydraulic line 240 operated with a button 241 on the remote control panel. When the valve is in a closed position spray is forced up nozzle supply lines 193, 194, 195, 196 and 197, while an open valve position enables the spray to flow through the valve into return line 233. The spray return line links the spray valves along with by-pass lines 176, 182, 226 and 230 to the spray tank.

Two cylinder pump 136 is driven by drive means which vary the pump speed in proportion to the ground speed of the sprayer. These drive means include a drive sprocket 242 mounted on the axle 14, with sprocket chain 244 trained about the drive sprocket and a driven sprocket 246, which is mounted on jack shaft 248. The gear ratio of the wheel drive sprocket to the driven jack shaft sprocket performs the function of increasing speed and torque transmitted to the jack shaft. A drive pulley 250 is mounted on the jack shaft and a driven pulley 254 is mounted on a shaft 256, located at the lower input side of a variable speed transmission 258. A belt 252 is trained about drive pulley 250 and the driven pulley 254 to transfer rotation thereto. A drive wheel 260 is mounted on the power output side of the variable speed transmission and is linked by a belt 262 with a driven wheel 264, which is mounted on an input shaft 265 of the pump. Thus, positive rotation of ground wheel 16 drives the pump in proportion to the ground speed of the sprayer. A tachometer head 266 (FIG. 3) is connected to the driven shaft of the pump and is calibrated to indicate the RPM-GPM output. This enables an operator to regulate the variable speed transmission by manual control to vary the pump speed and GPM output in the correct rate for the selected ground speed and application.

Figure 6:
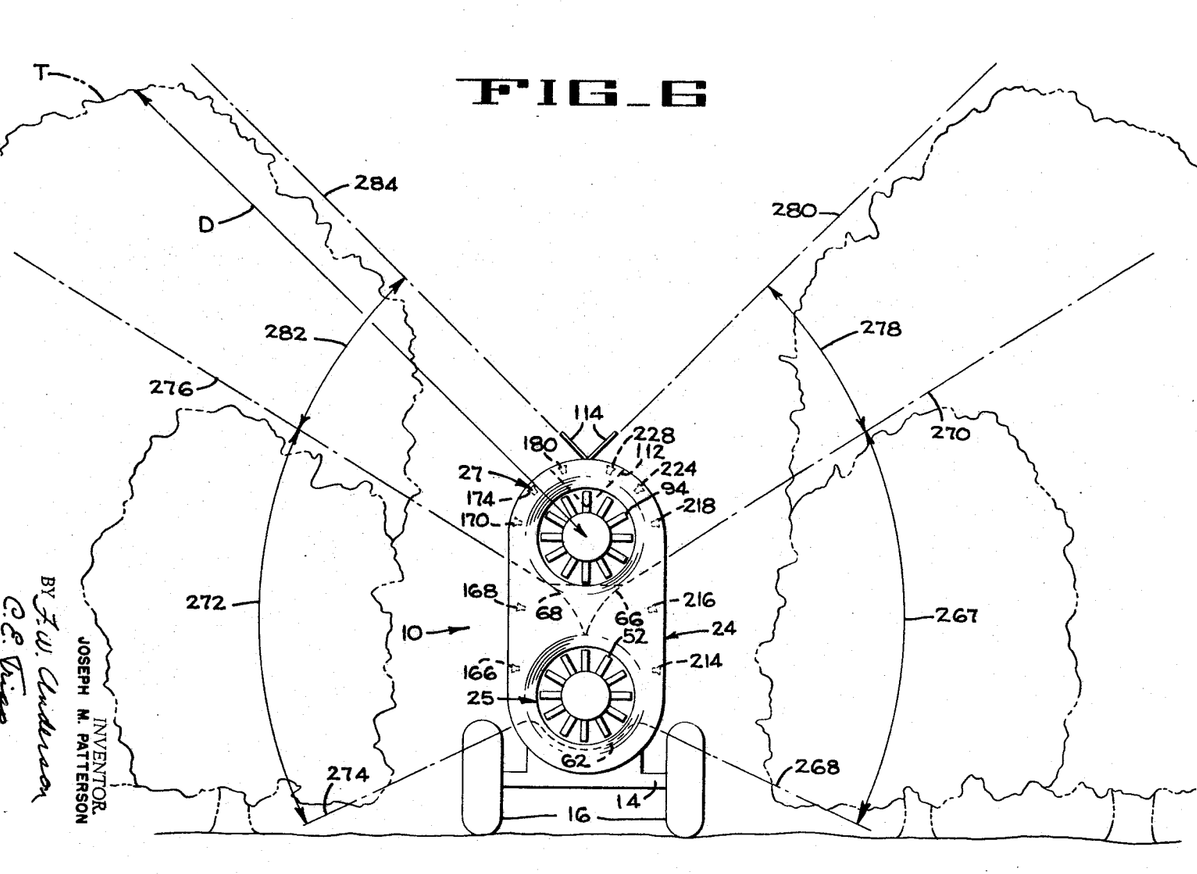

Looking now at FIGURE 6, it will be seen that impeller 52 discharges an air blast on the lower right hand side of the sprayer 10, between bottom deflector 62 and splitter vane 66. The spray zone of this air blast is indicated by the arc 267 which extends between lines 268 and 270. On the lower left hand side of the sprayer, an air blast is discharged between lines 274 and 276 covering a spray zone indicated by arc 272. Impeller 94 discharges an air blast on the upper right hand side of the sprayer, covering a spray zone as represented by arc 278 between lines 270 and 280. On the upper left hand side, an air blast is discharged to cover a spray zone indicated by arc 282 between lines 276 and 284. It will be noted that arcs 267 and 272, representing the spray zones from the lower impeller, are about twice as large as arcs 278 and 282, representing the spray zones from the upper impeller. While air blast discharges represented by arcs 267 and 272 project substantially straight outward from the sprayer, the discharges represented by arcs 278 and 282 angle outward and upwardly therefrom.

The "stacked" arrangement of impellers 52 and 94 enables the sprayer to cover the crops to be sprayed with a more uniform spray deposition and greater efficiency. By elevating impeller 94 above fan 52, the flight distance D from the impeller to the top of tree T (FIG. 6) is reduced so that there is less droplet evaporation and a better angle of inclination is achieved because there is less foliage impedance and lower horsepower requirements for the flight. The horsepower requirements of both impellers are less than would be required to turn one large impeller which would give a comparable air blast output. Since each impeller serves separated flow passages, higher air velocities are obtained at each air outlet than if the flow passages were in communication with each other.

In operation, the sprayer 10 is coupled to a tractor, not shown, for pulling the sprayer through an orchard. Spray tank 130 is filled with spray solution and variable speed transmission 258 is set by manual control for the desired application rate of spray, based upon a selected ground speed to be maintained. Engine 124 is started and drives impellers 52 and 94, drawing air through axial openings 35 and 77, respectively. Air from opening 35 is forced through flow passage 39 to air outlet 60, while air from opening 77 passes through flow passage 85 to air outlets 102 and 110. The discharges from these air outlets are in the form of high velocity air blasts, as indicated in FIGURE 6.

As the sprayer 10 moves along the ground, rotation of wheel 16 is transmitted through the variable speed transmission 258 to the input shaft 265 of the two cylinder spray pump 136. This pump is driven at a rate substantially proportional to the ground speed of the sprayer and spray solution circulates between the pump and spray tank 130, so long as spray valves 232 and 238 are open. Control valves 172, 178, 220 and 222 are positioned manually for the desired spray pattern depending upon the height of trees to be sprayed. When it is desired to commence spraying, buttons 235 and 241 on remote control panel 236 are activated, sending hydraulic pressure through lines 234 and 240, to close the spray valves. Spray solution is then forced through the nozzle supply lines, proportioning orifices, check valves, and out the nozzles located in air outlets 60 and 102 of the blower assembly 24.

Spray solution from the nozzles is picked up by high velocity air blasts discharged from air outlets 60, 102 and 110. These air blasts cover the spray zones indicated in FIGURE 6 by arcs 267, 272, 278 and 282. Splitter vanes 66 and 68 within the blower assembly 24 limit the upward inclination of the lower air blasts, while first separator 104 and second separator 106 control the lower portion of the upper air blasts, by deflecting some air outward through air outlet 102 and diverting a larger amount of air towards air outlet 110, where it is directed upward. This duct arrangement enables the upper air blasts to blend together with the lower air blasts along lines 270 and 276, with relatively little disturbing turbulence. Air outlet 102 is aligned in the same vertical plane and positioned above air outlet 60, so that these air outlets form a common discharge slot from which the spray carrying air blasts are discharged. Air outlet 110 is positioned adjacent outlet 102 and although no spray nozzles are located within outlet 110, the air blasts therefrom cooperates with the air blast from outlet 102 to carry spray to the foliage.

As the tractor pulling the sprayer moves faster or slows down, the ground wheel drive of pump 136 automatically compensates the rate at which spray is supplied to the nozzles. Should it be necessary to stop the forward motion of the sprayer during spraying operation, the pump will stop and when pressure within the nozzle supply lines falls below the selected minimum, diaphragm check valves within the lines will close preventing drip therefrom.

When spraying an orchard where the trees are smaller than tree T, nozzles 180 and 228 can be turned off by control valves 178 and 222, respectively. Spray flow is thus directed past the nozzle into return lines 182 and 230 in the same amount as would have been discharged through the nozzles. The spray is metered by the pump pressure and the proportioning orifices 154 and 202 located on the pressure side of the control valves. Thus, no back pressures are developed at the manifolds 144 and 192 so that spray flow to the nozzles remaining open will remain at a proper metered rate. Similarly, nozzles 174 and 224 could be shut off without affecting the output from the remaining nozzles.

Although the best mode contemplated for carrying out the present invention has been herein shown and described, it will be apparent that modifications and variations may be made without departing from what is regarded to be the subject matter of the invention as set forth in the appended claims.

Having completed a detailed description of the invention so that those skilled in the art could practice the same, I claim:

1. Apparatus for spraying orchards and the like, comprising: a first blower unit with an air flow passage terminating in a first pair of radial opening air outlets on opposite sides thereof through which high velocity carrier air blasts are discharged in fan-shaped patterns extending substantially straight out from both sides of the unit, a second blower unit positioned above the first blower unit with its own air flow passage separated from the air flow passage of the first blower unit and terminating in a second pair of radial opening air outlets on opposite sides thereof which are separate from said first pair of outlets and through which high velocity carrier air blasts are discharged in fan shaped patterns extending outward upwardly from both sides of the second blower unit in contiguous relationship along the bottom edge with the top edge of the fan-shaped pattern extending outward from the first blower unit, and means for delivering spray to the air blasts whereby air blasts from the second blower unit carry spray upward to the top portions of trees while air blasts from the first blower unit carry spray outward to the lower portions thereof.

2. An apparatus as described in claim 1, wherein the radial opening air outlets of the first and second blower units are aligned in a common vertical plane.

3. Apparatus for spraying orchards and the like, comprising: a wheel supported frame; a spray tank mounted upon said frame for storing a supply of spray solution, a pump having an intake line connected to said spray tank, means linking said pump with a wheel supporting the frame for driving the pump in proportion to rotation of the wheel, a spray distribution system connected to said pump with a plurality of lines for distributing spray to a carrier air blast, and a proportioning orifice positioned within each line for controlling the flow therein.

4. An apparatus as described in claim 3, wherein said spray distribution system includes a diaphragm valve positioned within each line for stopping the flow therein when pressure within the line falls below a selected minimum.

5. An apparatus as described in claim 3, wherein said spray distribution system includes a two-way valve adjacent the discharge end of one spray supply line and a return line extending back to the spray supply tank whereby spray flow can be diverted back to the supply tank without affecting the metered spray flow in an other spray supply line.

6. An apparatus as described in claim 3, wherein said pump has two cylinders, each cylinder having a separate discharge outlet, and said spray distribution system includes a first conduit connected to one pump discharge outlet, an anti-pulsation air chamber and filter coupled within the first conduit, a first manifold connected to the first conduit, a multiplicity of spray supply lines extending from the first manifold, each spray supply line having a separate nozzle connected thereto, a second conduit connected to the other pump discharge outlet, a second anti-pulsation air chamber and filter coupled within the second conduit, a second manifold connected to the second conduit, a multiplicity of spray supply lines extending from the second manifold, each spray supply line extending from the second manifold having a separate nozzle connected thereto, a spray return line connected with the spray supply tank, a first valve positioned between the first manifold and spray return line, and a second valve positioned between the second manifold and the spray return line, said first and second valves regulating the flow to the first and second manifolds, respectively, and to the spray return line.

7. An apparatus as described in claim 3, wherein the means linking said pump with a wheel supporting the frame for driving the pump in proportion to rotation of the wheel include a variable speed transmission whereby a selection of positive chain drive ratios are available to drive the pump at a desired output rate for an estimated ground speed.

8. Apparatus for spraying orchards and the like, comprising: a first blower unit with an air flow passage terminating in a pair of radial opening air outlets on opposite sides thereof through which high velocity carrier air blasts are discharged in fan-shaped patterns extending substantially straight out from both sides of the unit, a second blower unit positioned above the first blower unit with an air flow passage separated from the air flow passage of the first blower unit and terminating in a pair of radial opening air outlets on opposite sides thereof which are aligned in a common vertical plane with the air outlets of the first blower unit and through which high velocity carrier air blasts are discharged in fan-shaped patterns extending outward upwardly from both sides of the second blower unit in contiguous relationship along the bottom edge with the top edge of the fan-shaped pattern extending outward from the first blower unit, and means for delivering spray to the air blasts whereby air blasts from the second blower unit carry spray upward to the top portions of trees while air blasts from the first blower unit carry spray outward to the lower portions thereof, said apparatus further having a vertical deflector positioned within the air flow passage of the first blower unit between the radial opening air outlets for separating the flow of air within the passage, a first splitter vane extending in an arcuate path from the top position of the vertical deflector to the top of the radial opening air outlet on one side and a second splitter vane extending in an arcuate path from the top portion of the vertical deflector to the top of the radial opening air outlet on the opposite side, said arcuate paths of the first and second splitter vanes becoming tangent to a horizontal line extending between the tops of the radial opening air outlets.

9. An apparatus as described in claim 8, wherein the air flow passage of the second blower unit has a first separator extending outward on a radial line to the bottom of one radial opening air outlet and a second separator extending outward on a radial line to the bottom of the other radial opening air outlet, the bottoms of said radial opening air outlets of the second blower unit being adjacent the tops of the radial opening air outlets of the first blower unit.

10. Apparatus for spraying orchards and the like, comprising: a first blower unit with an air flow passage terminating in a first pair of radial opening air outlets on opposite sides thereof through which high velocity carrier air blasts are discharged in fan-shaped patterns extending substantially straight out from both sides of the unit, a second blower unit having an air flow passage terminating in a second pair of radial opening air outlets on opposite sides thereof which are separate from said first pair of outlets and through which high velocity carrier air blasts are discharged in fan-shaped patterns extending outwardly from both sides of the second blower unit in contiguous relationship along the bottom edge with the top edge of the fan-shaped pattern extending outward from the first blower unit, means for delivering concentrated liquid spray material to the air blasts, and means for positioning said second blower unit in spaced relation above said first blower unit and substantially at the elevation of an upper portion of the trees being treated whereby air blasts from the second blower unit moves spray outwardly to the top portions of the trees in a direction such that the droplets do not have to travel far before contacting the trees, and air blasts from the first blower unit carry spray droplets outward to the lower portions thereof.

References Cited

UNITED STATES PATENTS

| | | | |
|---|---|---|---|
| 2,475,449 | 7/1949 | Daughety | 239—78 |
| 2,569,274 | 9/1951 | Andrews | 239—78 |
| 2,706,596 | 4/1955 | Hait | 239—78 X |
| 3,261,551 | 7/1966 | Funk et al. | 239—78 X |
| 3,361,357 | 1/1968 | Johnston | 239—127 |

EVERETT W. KIRBY, Primary Examiner

U.S. Cl. X.R.

239—78

FO-1050
(1/69)

UNITED STATES PATENT OFFICE
CERTIFICATE OF CORRECTION

Patent No. 3,489,351                          Dated January 13, 1970

Inventor(s) J.M. PATTERSON

It is certified that error appears in the above-identified patent and that said Letters Patent are hereby corrected as shown below:

Column 4, line 53 - change "Cyclone" to -- Cycone --.
Column 5, line 9  - after "by" insert -- pass --.

Signed and sealed this 6th day of April 1971.

(SEAL)
Attest:

EDWARD M. FLETCHER, JR.                WILLIAM E. SCHUYLER, JR.
Attesting Officer                      Commissioner of Patents